United States Patent [19]

Noda et al.

[11] 4,407,826

[45] Oct. 4, 1983

[54] METHOD OF PRODUCING KOJI PRODUCTS

[75] Inventors: Fumio Noda, Kamagaya; Kazuya Hayashi, Kashiwa; Keitaro Mogi, Noda; Takashi Iwaasa, Noda; Toshio Sakasai, Noda; Nobuyoshi Iguchi, Noda, all of Japan

[73] Assignee: Kikkoman Shoyu Co. Ltd., Chiba, Japan

[21] Appl. No.: 303,124

[22] Filed: Sep. 17, 1981

Related U.S. Application Data

[63] Continuation of Ser. No. 73,804, Sep. 10, 1979, abandoned.

[30] Foreign Application Priority Data

Sep. 12, 1978 [JP] Japan ................................ 53-111330

[51] Int. Cl.³ .......................... A23L 1/20; A23L 1/10; A23L 1/238
[52] U.S. Cl. ........................................... 426/7; 426/9; 426/18
[58] Field of Search .......................... 426/18, 335, 7, 9

[56] References Cited

U.S. PATENT DOCUMENTS

| 3,792,177 | 2/1974 | Nakatani et al. | 426/335 |
| 3,819,329 | 6/1974 | Kaestner et al. | 426/335 |
| 3,978,235 | 8/1976 | Schiro | 426/335 |
| 4,028,470 | 6/1977 | Hayashi et al. | 426/18 |
| 4,115,591 | 9/1978 | Noda et al. | 426/18 |
| 4,117,169 | 9/1978 | Noda et al. | 426/18 |

FOREIGN PATENT DOCUMENTS 43-20697 of 1968 Japan .
51-54991 of 1976 Japan .
52-130996 of 1977 Japan .
53-107488 of 1978 Japan .

Primary Examiner—Alvin E. Tanenholtz
Attorney, Agent, or Firm—Sherman & Shalloway

[57] ABSTRACT

In a method for producing a fermentation product which comprises inoculating a mold in a substrate and cultivating it, the improvement which comprises adding (A) at least one compound selected from the group consisting of salts of aliphatic carboxylic acids having 1 to 4 carbon atoms, and (B) at least one compound selected from the group consisting of chlorous acid, hypochlorous acid, sulfurous acid, hyposulfurous acid, hydrogensulfurous acid, pyrosulfurous acid, salts of these acids, hydrogen peroxide, bleaching powder, chloramine-B, chloramine-T, halazone and acrylamide at any time ranging from a step of preparing the substrate to the step of cultivation.

3 Claims, No Drawings

METHOD OF PRODUCING KOJI PRODUCTS

This is a continuation of application Ser. No. 73,804 filed Sept. 10, 1979, now abandoned.

This invention relates to a method for cultivating a mold which comprises inoculating a mold in a substrate and cultivating it to obtain fermentation products such as fermented food products and enzymes, while markedly and advantageously inhibiting the growth of undesirable contaminating bacteria and positively promoting the growth of the desired mold on the substrate.

More specifically, this invention relates, in a method for producing a fermentation product by inoculating a mold in a substrate and cultivating it, to the improvement which comprises adding (A) at least one compound selected from the group consisting of salts of aliphatic carboxylic acids having 1 to 4 carbon atoms and (B) at least one compound selected from the group consisting of chlorous acid, hypochlorous acid, sulfurous acid, hyposulfurous acid, hydrogen-sulfurous acid, pyrosulfurous acid, salts of these acids, hydrogen peroxide, bleaching powder, chloramine-B, chloramine-T, halazone and acrylamide at any time during a step of preparing the substrate or during the step of cultivation.

It has previously been known to produce fermentation products including fermented food products such as soy sauce, miso, sake and mirin and enzymes such as protease, amylase and pectinase by inoculating a mold in a substrate and cultivating it, and such a process has been actually practiced. In the production of such fermentation products, a desired mold (e.g., a koji mold) is inoculated in a koji-making material such as soybean, wheat and rice and is subjected to solid cultivation. At this time, koji is usually produced in an open system. Furthermore, bacteria readily grow on fermentation materials which have been denatured by steaming and heat-sterilized. It is very difficult for this reason to selectively inhibit the inclusion and growth of undesired bacteria during the making of koji and to promote the growth of the desired mold. In spite of a number of prior suggestions, it is still strongly desired to provide a cultivation method which can overcome the above difficulties.

For example, U.S. Pat. No. 4,115,591 (corresponding to Japanese Laid-Open Patent Publication No. 130996/77) discloses a process for producing koji which comprises inoculating a koji mold in a modified koji substrate and cultivating it at a temperature of 20° to 40° C. for a time sufficient to produce koji, the substrate having added thereto 0.05 to 8% by weight, based on the total weight of the unmodified koji substrate, a sodium or potassium salt of an aliphatic carboxylic acid containing up to 4 carbon atoms so as to inhibit bacterial contamination of the cultivation system.

Japanese Patent Publication No. 20697/69 discloses a method for producing a soy sauce koji, which comprises adding sulfurous acid or a sulfite such as potassium pyrosulfite, sodium hydrogen sulfite, potassium hydrogen sulfite, sodium sulfite, potassium sulfite and sodium hyposulfite to a proteinaceous material for the making of soy sauce koji so as to inhibit bacterial contamination during the production of koji, denaturing the proteinous material before or after the addition of the aforesaid compound, thus adjusting the content of sulfurous acid or the sulfite as $SO_2$ in the proteinous material to 0.04 to 0.24% based on the water-containing proteinous material, then mixing a carbohydrate material and a seed koji, and subjecting the mixture to a customary koji-making process.

Japanese Laid-Open Patent Publication No. 107488/78 suggests a process for making solid koji having reduced bacterial contamination, which comprises adding formic acid to a mixture of materials before or after the denaturation treatment in a customary manner of the mixed materials, so that the concentration of formic acid in water contained in the mixed materials at the start of koji production is 0.06 to 2.0% (w/w), then inoculating a mold in the mixed materials, and cultivating it.

U.S. Pat. No. 4,028,470 aims at preventing bacterial contamination without adverse effects on the growth of a koji mold, and provides a process for producing koji for fermented food products by modifying an unmodified koji-substrate composed of a vegetable protein material and a vegetable carbohydrate material, inoculating a koji mold in the resulting modified koji-substrate, and cultivating it, wherein said cultivation is carried out in the presence of 0.1 to 1.2% by weight, based on the water content of the modified koji-substrate, of acetic acid added.

Japanese Laid-Open Patent Publication No. 54991/76 discloses a method for producing koji having a high enzyme potency with little bacterial contamination within a short period of time, which comprises adding an aqueous solution containing at least one of sodium chloride, ethyl alcohol, propionic acid salts, amino acids and antibiotics such as penicillin to mold spores obtained in a known customary manner, spraying the resulting seed koji on koji-making materials, and subjecting them to a customary koji-making process.

However, none of these prior methods are entirely satisfactory in achieving the purpose of selectively and markedly inhibiting bacterial contamination caused by the growth of unwanted bacteria and of positively promoting the growth of the desired mold without inhibiting its growth.

The present inventors have made investigations in order to provide an improved method which can satisfactorily produce an effect of inhibiting bacterial contamination and an effect of promoting the growth of the desired mold.

These investigations have led to the discovery that by adding (A) at least one $C_1$–$C_4$ aliphatic carboxylic acid salt and (B) at least one specified compound described hereinabove at a time ranging from a step of preparing the substrate to a step of cultivation, preferably at any time ranging from the preparation of the cultivation substrate to the inoculation of the desired mold, there can be obtained a markedly improved effect of inhibiting the growth of aerobic and anaerobic bacteria over the case of adding at least one of either compound (A) or compound (B), and an effect of promoting the growth of the desired mold while exerting no adverse effects on it in contrast to the case of adding the compound (B) alone in which the growth of the mold is inhibited.

This also brings about an effect of preventing corrosion of apparatuses used for preparing the substrate or for cultivation, which are made of aluminum, iron, stainless steel, synthetic rubbers, etc.

It is an object of this invention therefore to provide an improved method for cultivating a mold.

The above and other objects of this invention along with its advantages will become more apparent from the following description.

The present invention provides a method for cultivating a mold for producing fermentation products which comprises inoculating in a cultivation substrate a mold, for example a koji mold for the production of fermented food products such as soy sauce, miso, sake and mirin or a mold capable of producing an enzyme such as protease, amylase or pectinase, and cultivating the mold, the improvement which comprises adding (A) at least one compound selected from the group consisting of salts of aliphatic carboxylic acids having 1 to 4 carbon atoms and (B) at least one compound selected from the group consisting of chlorous acid, hypochlorous acid, sulfurous acid, hyposulfurous acid, hydrogensulfurous acid, pyrosulfurous acid, the salts of these acids, hydrogen peroxide, bleaching powder, chloramine-B (sodium N-chlorobenzenesulfonamide), chloramine-T (sodium N-chloro-p-toluenesulfonamide), halazone (p-sulfondichloraminobenzoic acid), and acrylamide at a time ranging from the preparation of the substrate to the cultivation of the mold, preferably at any time from the preparation of the substrate to a time before the inoculation of the mold.

Suitable acids in the salts (A) include formic acid, acetic acid, propionic acid and butyric acid. Preferred salts are alkali metal salts or alkaline earth metal salts, such as sodium, potassium, calcium or magnesium salts. These salts can be used either alone or in combination with each other. Suitable salts of the acids in group (B) include alkali metal salts and alkaline earth metal salts similar to the salts (A), and they can be used either singly or in combination with each other.

The method of this invention can be advantageously used in the cultivation of molds for the production of a wide range of fermentation products. It can be especially advantageously applied to the cultivation of koji molds for the production of fermented food products such as soy sauce, miso, sake and mirin and to the cultivation of molds for enzyme production.

Examples of known molds include koji molds for the production of fermented food products such as soy sauce, miso, sake and mirin, for example, *Aspergillus oryzae* (ATCC 20386), *Aspergillus oryzae* (ATCC 11866) and *Aspergillus oryzae* (ATCC 14895); and molds capable of producing enzymes, such as *Aspergillus phoenicis* (ATTC 14332), *Aspergillus niger* (ATCC 1004), *Aspergillus usami* (ATCC 14331), *Aspergillus awamori* (ATCC 14333), *Aspergillus awamori* (ATCC 14335), *Rhizopus oryzae* (ATCC 4858), *Rhizopus oryzae* (HUT 1270), *Rhizopus oligosporus* (ATCC 22959), *Rhizopus japonicus* (ATCC 8466), *Rhizopus formosaensis* (IAM 6245), *Mucor circinelloides* (ATCC 15242), *Mucor javanicus* (IAM 6108), *Mucor circinelloides* (ATCC 8770), *Penicillium glaucum* (AHU 8026) and *Penicillium fuscum* (ATCC 10447).

In the designation of microorganism depositories in the above exemplification, HUT stands for Hiroshima University, Faculty of Engineering, Hiroshima, Japan; IAM, for Institute of Applied Microbiology, University of Tokyo, Japan; and AHU, for Faculty of Agriculture, Hokkaido University, Sapporo, Japan.

According to the method of this invention, at least one compound (A) and at least one compound (B) are added at a time ranging from the preparation of the cultivation substrate to the cultivation of molds, preferably at a time ranging from the preparation of the cultivation substrate to a time before the cultivation, more preferably from the preparation of the cultivation substrate to a time before the inoculation of a mold of the type exemplified above.

In the step of preparing the cultivation substrate for use in the method of this invention, a wide range of nitrogen sources, carbon sources and mineral sources suitable for the cultivation of molds can be used. Examples of the nitrogen sources are soybean, defatted soybean, gluten and fishmeal. Examples of the carbon sources are rice, wheat, corn, soy sauce lees, mirin lees, sake lees, wheat husk and rice bran.

These materials for the preparation of the substrate can be used either singly or in combination with one another. In the preparation of the substrate, these materials can be used either as such or after they have been dipped in water, or denatured or converted to an alpha-form by means known per se.

According to a preferred embodiment of this invention, the cultivation substrate includes a denatured product or an alpha-form of at least one member of the group consisting of soybean, defatted soybean, gluten, rice, wheat, corn, soy sauce lees, mirin lees, sake lees, wheat husk, rice bran and fishmeal. The substrate may be in the form of any of solid, liquid and solid-liquid substrates.

According to the method of this invention, at least one compound (A) and at least one compound (B) are added to the cultivation substrate at a time ranging from the preparation of the substrate to the step of cultivation, preferably from the preparation of the substrate to a time before the initiation of cultivation, more preferably from the preparation of the substrate to a time before the inoculation of a desired mold.

Most preferably, such compounds can be added at a time ranging from a time during the preparation of the substrate including the step of treating materials for the substrate to a time before the inoculation of the desired mold in the prepared substrate. More specifically, at least one compound (A) and at least one compound (B) can be added during the water dipping treatment of raw materials for the substrate, for example raw materials for koji, or during water sprinkling before and/or after the denaturation or alpha-form converting treatment of the raw materials for koji making, or to the resulting substrate before the inoculation of the desired mold.

The amounts of the compounds (A) and (B) can be selected properly. The total amount of the compounds (A) and (B) is preferably about 0.01 to about 2% by weight, more preferably about 0.05 to about 1% by weight, based on the weight of the substrate (denoting the weight of raw materials for the substrate in the case of the step of preparing the substrate, or the weight of the prepared substrate in the case of the cultivation step).

If the total amount of these compounds is smaller than the specified limit, inhibition of bacterial contamination is likely to be insufficient. If the amount is larger than the specified limit, adverse effects are exerted on the growth of the desired mold.

The ratio of the compound (A) to the compound (B) can be varied depending upon the time of addition, the composition of the culture medium, the type of the mold used, etc. For example, the weight ratio of the compound (A) to the compound (B) is from 1:4 to 4:1. When bacteria which may cause bacterial contamination are present in relatively large amounts in the substrate at the initiation of the cultivation of the mold, the weight ratio of the compound (A) to the compound (B) can be set at 1-2:3-4, for example. When these compounds are to be added during the cultivation of the mold and relatively large amounts of the bacteria are present, the weight ratio of the compound (A) to the compound (B) can be adjusted to 3–4:1–2, for example. In other case, the weight ratio of (A) to (B) may be about 1:1.

Addition of the compounds (A) and (B) can be effected, for example, by mixing or spraying powders, liquids, solid-liquid or a diluted solution or suspension of these compounds with or onto the raw materials for the preparation of the substrate or the prepared substrate.

Conditions for cultivating the mold in the method of this invention are properly selected according to the type of the mold used. For example, in the case of a koji mold for the production of fermented food products such as soy sauce, miso, sake and mirin, the pH of the cultivation system may be about 3.5 to about 8.0, and the cultivation temperature may be about 20° to about 40° C. In the case of cultivating enzyme-producing molds, the pH of the cultivation system may be about 2.0 to about 8.0, and the cultivation temperature may be about 20° to about 50° C. The cultivation time can be properly chosen, and is, for example, about 30 to about 100 hours in the case of koji molds, and about 15 to about 100 hours in the case of enzyme-producing molds.

The cultivation can be performed by any desired means such as stationary cultivation, aerating cultivation, agitation-aeration cultivation or shaking cultivation. The stationary cultivation procedure is preferred.

According to the method of this invention, contamination by unwanted aerobic and anaerobic bacteria during the step of preparing a cultivation substrate or during a cultivation step can be markedly inhibited by using relatively simple operations and by using inexpensive and readily available additives, and the desired mold can be cultivated with a good efficiency. Furthermore, according to this invention, corrosion of apparatuses used for the preparation of the cultivation substrate or for cultivation can be prevented. Accordingly, fermentation products can be manufactured with great advantage by the fermentation of mold.

The following Examples illustrate the present invention more specifically.

EXAMPLE 1

Onto each of 21 lots of defatted soybeans (each lot weighing 10 kg) was uniformly sprayed 13.5 liters of hot water at 80° C. in which 100 g of each of the additives shown in Table 1 was dissolved.

The defatted soybeans were steamed for 10 minutes with saturated steam at 133° C. and 2 kg/cm² (gauge). The treated soybeans were mixed with 10 kg of roasted and crushed wheat, and 100 g of a koji mold (the number of available spores $10^9/$ g), *Aspergillus oryzae* (ATCC 14895), was inoculated in each mixture, and then 3 ml of a suspension (the number of living cells $2 \times 10^8$/ml) of various bacteria separated from soy sauce koji was uniformly sprayed onto the cultivation system. Each of the lots was placed on a wooden tray, and in an incubator held at 30° C., was subjected to 42 hours to a usual control of making soy sauce koji. Thus 21 types of soy sauce koji were obtained.

The degree of growth of the koji mold in the resulting koji, the specific activities of amylase and protease, and the number of living bacterial cells at different times were measured. The results are shown in Table 1.

The number of living bacterial cells was determined as follows: One gram of koji was suspended in 100 ml of physiological saline. One ml of the resulting suspension was mixed with 7 ml of a culture medium of the following composition, and cultivated at 37° C. for 24 hours. The number of colonies that appeared was measured.

Composition of the culture medium for the measurement of the number of living cells:

| | |
|---|---|
| Meat extract | 1% (w/v) |
| Polypeptone | 1% (w/v) |
| Yeast extract | 0.5% (w/v) |
| Glucose | 1% (w/v) |
| Agar | 1.5% (w/v) |
| pH | 7.0 |

The specific activities of protease and amylase are values relative to the activities of these enzymes in koji No. 21 which are taken as 1. The activities of protease and amylase were measured by the following method.

The grams of the koji was mixed with 100 ml of distilled water, and the mixture was allowed to stand for 24 hours at 5° C. The mixture was then filtered, and the filtrate was used as an enzyme solution. The protease and amylase activities of this solution were determined by the method described in the Japanese-language publication "Science of Seasoning", Vol. 22, No. 3, page 14 (1975).

The degree of growth of the mold was evaluated on the following scale using the degree of growth in koji No. 21 having no additives as a criterion.
 −:Growth worse than Koji No. 21
 ±:Growth same as koji No. 21
 +:Growth better than koji No. 21
 ++:Growth better than +.

TABLE 1

| Sample koji No. | | Additives and amounts (w/w) | | Degree of growth of koji mold | Enzyme activities of koji | | Number of living bacterial cells in koji (per gram) | | |
|---|---|---|---|---|---|---|---|---|---|
| | | | | | Specific protease activity | Specific amylase activity | At the start of koji making | 18 hours after the start | At the end of koji making (42 hours from the start) |
| Invention | 1 | Sodium acetate | 0.25% | ++ | 2.10 | 1.3 | $3.6 \times 10^1$ | $1.8 \times 10^2$ | $2.0 \times 10^2$ |
| | | Sodium hydrogensulfite | 0.25% | | | | | | |
| Invention | 2 | Sodium acetate | 0.25% | ++ | 1.95 | 1.3 | $2.8 \times 10^1$ | $1.1 \times 10^2$ | $2.0 \times 10^2$ |
| | | Sodium hyposulfite | 0.25% | | | | | | |
| Invention | 3 | Potassium acetate | 0.25% | ++ | 1.88 | 1.2 | $3.1 \times 10^1$ | $1.2 \times 10^2$ | $2.3 \times 10^2$ |
| | | Sodium pyrosulfite | 0.25% | | | | | | |
| Invention | 4 | Potassium acetate | 0.25% | ++ | 1.74 | 1.2 | $2.9 \times 10^1$ | $1.5 \times 10^2$ | $1.7 \times 10^2$ |
| | | Potassium pyrosulfite | 0.25% | | | | | | |
| Invention | 5 | Sodium propionate | 0.25% | ++ | 2.03 | 1.3 | $3.0 \times 10^1$ | $1.1 \times 10^2$ | $1.0 \times 10^2$ |

TABLE 1-continued

| Sample koji No. | | Additives and amounts (w/w) | | Degree of growth of koji mold | Enzyme activities of koji | | Number of living bacterial cells in koji (per gram) | | |
|---|---|---|---|---|---|---|---|---|---|
| | | | | | Specific protease activity | Specific amylase activity | At the start of koji making | 18 hours after the start | At the end of koji making (42 hours from the start) |
| Invention | 6 | Sodium hydrogensulfite<br>Sodium propionate<br>Sodium hyposulfite | 0.25%<br>0.25%<br>0.25% | ++ | 2.10 | 1.4 | $3.1 \times 10^1$ | $5.0 \times 10^1$ | $9.3 \times 10^1$ |
| Invention | 7 | Sodium acetate<br>Hyposulfurous acid | 0.25%<br>0.25% | ++ | 1.60 | 1.2 | $3.0 \times 10^1$ | $7.0 \times 10^1$ | $1.2 \times 10^2$ |
| Invention | 8 | Sodium acetate<br>Hydrogen peroxide | 0.25%<br>0.25% | ++ | 1.65 | 1.2 | $3.0 \times 10^1$ | $7.5 \times 10^1$ | $1.2 \times 10^2$ |
| Invention | 9 | Sodium acetate<br>Bleaching powder | 0.25%<br>0.25% | ++ | 1.70 | 1.3 | $3.0 \times 10^1$ | $8.0 \times 10^1$ | $9.0 \times 10^1$ |
| Invention | 10 | Sodium acetate<br>Hypochlorous acid | 0.25%<br>0.25% | ++ | 1.66 | 1.2 | $3.0 \times 10^1$ | $5.5 \times 10^1$ | $8.8 \times 10^1$ |
| Control | 11 | Sodium acetate | 0.50% | ++ | 1.98 | 1.4 | $3.5 \times 10^1$ | $7.7 \times 10^4$ | $1.1 \times 10^6$ |
| Control | 12 | Sodium propionate | 0.50% | + | 2.01 | 1.3 | $2.9 \times 10^1$ | $8.0 \times 10^4$ | $9.5 \times 10^5$ |
| Control | 13 | Sodium hydrogensulfite | 0.50% | — | 0.80 | 0.7 | $3.3 \times 10^1$ | $5.5 \times 10^4$ | $9.0 \times 10^5$ |
| Control | 14 | Sodium hyposulfite | 0.50% | — | 0.72 | 0.7 | $2.8 \times 10^1$ | $3.3 \times 10^5$ | $5.5 \times 10^5$ |
| Control | 15 | Sodium pryrosulfite | 0.50% | — | 0.75 | 0.6 | $2.2 \times 10^1$ | $1.1 \times 10^5$ | $8.8 \times 10^5$ |
| Control | 16 | Potassium pyrosulfite | 0.50% | — | 0.77 | 0.8 | $3.6 \times 10^1$ | $9.0 \times 10^4$ | $3.2 \times 10^5$ |
| Control | 17 | Hypochlorous acid | 0.50% | — | 0.50 | 0.4 | $3.3 \times 10^1$ | $1.5 \times 10^3$ | $8.1 \times 10^4$ |
| Control | 18 | Hyposulfurous acid | 0.50% | — | 0.45 | 0.3 | $3.0 \times 10^1$ | $1.9 \times 10^3$ | $7.5 \times 10^4$ |
| Control | 19 | Hydrogen peroxide | 0.50% | — | 0.30 | 0.3 | $2.9 \times 10^1$ | $2.1 \times 10^3$ | $2.9 \times 10^4$ |
| Control | 20 | Bleaching powder | 0.50% | — | 0.45 | 0.4 | $2.9 \times 10^1$ | $1.8 \times 10^3$ | $3.3 \times 10^4$ |
| Control | 21 | Not added | — | — | 1.00 | 1.0 | $3.1 \times 10^1$ | $5.5 \times 10^7$ | $7.0 \times 10^8$ |

It is clear from Table 1 that the present invention (koji samples Nos. 1 to 10) is much superior in the degree of growth to the control (koji Nos. 11 to 21), has the same or higher specific activities of protease and amylase produced by the koji mold as or than the control, and further shows a much less number of living bacterial cells than the control.

Each of koji products Nos. 1, 5, 11, 13 and 21 together with 40 liters of a 22% (w/v) aqueous solution of sodium chloride was subjected to a usual control of moromi production at 30° C. for 150 days, followed by squeezing. The ratio of nitrogen utilization and the components of the resulting moromi liquid were determined, and the moromi liquid was organoleptically tested. The results are shown in Table 2.

The ratio of nitrogen utilization is the percentage of the amount of dissolved nitrogen in the resulting soy sauce based on the total account of nitrogen contained in the soy sauce-making materials. NaCl, T.N., Glu., R.S., and Alc. in the column of analysis value of the moromi stand for sodium chloride, total nitrogen, glutamic acid, reducing sugars, and alcohol, respectively. The analysis was carried out by the method described in the Japanese-language publication "Analysis Methods in Fermentation" (by Shoichi Yamada, published by Sangyo Tosho Kabushiki Kaisha).

In the organoleptic test, the taste of each of moromi liquids obtained by using koji samples Nos. 1, 5, 11 and 13 was compared with that of the moromi liquid from koji No. 21. The results were rated on a scale of 0 (no difference), 1 (some difference), 2 (large difference) and 3 (very large difference). Where the moromi had a better flavor than the moromi from koji No. 21, the sign (+) was attached. The sign (−) thus shows that the flavor of the moromi was inferior to that of the moromi from koji No. 21. These ratings were averages of the results obtained by 20 well-trained panelists having a differentiating ability. The sign (*) in the column of "Value" shows that the difference was significant at 5% level; the sign (**) shows that the difference was significant at 1% level; and the sign (−) shows that the difference was not significant.

TABLE 2

| Items of measurement<br>Samples | | NaCl (%) | T.N. (%) | Glu. (mg/ml) | R.S. (%) | Alc. (%) | Ratio of nitrogen utilization (%) | Organoleptic test | |
|---|---|---|---|---|---|---|---|---|---|
| | | | | | | | | Rating | Value |
| Invention | Moromi liquid from koji No. 1 | 17.15 | 1.82 | 16.1 | 5.20 | 2.65 | 87.8 | +2.5 | ** |
| Invention | Moromi liquid from koji No. 5 | 17.15 | 1.79 | 16.0 | 5.15 | 2.50 | 87.1 | +2.3 | ** |
| Control | Moromi liquid from koji No. 11 | 17.15 | 1.78 | 15.8 | 5.15 | 2.40 | 86.8 | +2.0 | ** |
| Control | Moromi liquid from koji No. 13 | 17.15 | 1.70 | 11.8 | 3.25 | 2.10 | 82.0 | +0.4 | * |
| Control | Moromi liquid from koji No. 21 | 17.15 | 1.72 | 12.1 | 3.55 | 2.45 | 82.6 | 0 | — |

It is seen from the results shown in Table 2 that the present invention is equivalent or better to or than the control in regard to T.N., Glu., R.S., Alc., the ratio of nitrogen utilization and the results of the organoleptic test.

EXAMPLE 2

Ten types of soy sauce koji were produced in the same way as in Example 1 except that 13.5 liters of hot water at 80° C. having 100 g of each of the additives indicated in Table 3 dissolved therein instead of the additives shown in Table 1 was uniformly sprayed onto defatted soybeans.

The degree of growth of the koji mold, the specific activities of amylase and protease, and the number of living bacterial cells at different times were measured on the resulting koji products. The results are shown in Table 3.

Each of koji samples Nos. 5 and 10 obtained together with 40 liters of 22% (w/v) aqueous solution of sodium chloride was subjected to a usual control of moromi making at 30° C. for 150 days, followed by squeezing. The resulting moromi liquids were tested for the ratio of nitrogen utilization and the components and also organoleptically tested in the same way as in Example 1. The results are shown in Table 4.

TABLE 4

| Items of measurement Sample | Analysis of components of moromi liquid | | | | | Ratio of nitrogen utilization (%) | Organoleptic test | |
|---|---|---|---|---|---|---|---|---|
| | NaCl (%) | T.N. (%) | Glu. (mg/ml) | R.S. (%) | Alc. (%) | | Rating | Value |
| Moromi liquid from koji No. 5 (invention) | 17.15 | 1.83 | 15.9 | 5.40 | 2.60 | 87.8 | +2.2 | ** |
| Moromi liquid from koji No. 10 (control) | 17.25 | 1.74 | 12.9 | 4.00 | 2.30 | 83.0 | 0 | — |

As is clear from Table 4, the present invention is superior to the control in regard to T.N., Glu., R.S., Alc., the ratio of nitrogen utilization and the results of the organoleptic test.

TABLE 3

| Koji sample No. | | Additives and amounts (w/w) | | | Degree of growth of koji mold | Specific protease activity | Specific amylase activity | At the start of koji making | 18 hours after the start | At the end of koji making (42 hours from the start) |
|---|---|---|---|---|---|---|---|---|---|---|
| Comparison | 1 | Sodium hydrogensulfite | 0.0025% | Potassium acetate 0.0025% | ± | 1.00 | 0.9 | $5.3 \times 10^1$ | $9.3 \times 10^4$ | $3.8 \times 10^5$ |
| Invention | 2 | Sodium hydrogensulfite | 0.005% | Potassium acetate 0.005% | + | 1.85 | 1.3 | $5.0 \times 10^1$ | $5.0 \times 10^2$ | $3.3 \times 10^3$ |
| Invention | 3 | Sodium hydrogensulfite | 0.01% | Potassium acetate 0.01% | ++ | 2.10 | 1.4 | $4.9 \times 10^1$ | $3.6 \times 10^2$ | $1.7 \times 10^3$ |
| Invention | 4 | Sodium hydrogensulfite | 0.025% | Potassium acetate 0.025% | ++ | 2.15 | 1.4 | $4.8 \times 10^1$ | $2.7 \times 10^2$ | $9.8 \times 10^2$ |
| Invention | 5 | Sodium hydrogensulfite | 0.1% | Potassium acetate 0.1% | ++ | 2.20 | 1.4 | $4.9 \times 10^1$ | $1.2 \times 10^2$ | $5.1 \times 10^2$ |
| Invention | 6 | Sodium hydrogensulfite | 0.5% | Potassium acetate 0.5% | ++ | 2.10 | 1.5 | $5.0 \times 10^1$ | $1.0 \times 10^2$ | $2.2 \times 10^2$ |
| Invention | 7 | Sodium hydrogensulfite | 1.0% | Potassium acetate 1.0% | + | 1.70 | 1.3 | $4.8 \times 10^1$ | $5.5 \times 10^1$ | $8.0 \times 10^1$ |
| Comparison | 8 | Sodium hydrogen sulphite | 1.25% | Potassium acetate 1.25% | — | 0.95 | 0.9 | $5.1 \times 10^1$ | $3.8 \times 10^1$ | $7.0 \times 10^1$ |
| Comparison | 9 | Sodium hydrogensulphite | 2.0% | Potassium acetate 2.0% | — | 0.90 | 0.8 | $5.2 \times 10^1$ | $2.9 \times 10^1$ | $5.5 \times 10^1$ |
| Control | 10 | Sodium hydrogensulfite | 0% | Potassium acetate 0% | | 1.00 | 1.0 | $5.5 \times 10^1$ | $2.1 \times 10^7$ | $7.0 \times 10^8$ |

It is seen that when the total amount of sodium hydrogensulfite and potassium acetate is within the range of 0.01 to 2.0% (w/w), especially 0.05 to 1.0% (w/w), the rsulting koji products are much superior in regard to the degree of growth of the koji mold, the enzyme activities of koji and the number of living bacterial cells in the koji.

EXAMPLE 3

A 1500-liter fermentation tank (for cultivation with aeration and agitation) was charged with 20 kg of koji, 5 kg of defatted soybeans, 50 g of sodium hydrogensulfite, 75 g of sodium acetate and 1000 liters of water. Saturated steam at 120° C. and 1 kg/cm² (gauge) was introduced into the tank for 15 minutes to steam the materials, followed by allowing them to cool to room temperature.

One kilogram of seed mold (the number of available spores: $10^9$/g; the number of contaminating bacteria: $2.1 \times 10^5$/g) of *Rhizopus oryzae* (HUT 1270) was inoculated in the resulting cultivation substrate, and cultivated for 60 hours at 30° C. at an air flow rate of 500 liters/min. with stirring at 150 rpm.

A control run was conducted in the same way as above except that sodium hydrogensulfite and sodium acetate were not added.

The degree of growth of the mold, the specific amylase and protease activities, and the number of living bacterial cells at different times were determined on the resulting fermented products in the same way as in Example 1. The pH value was measured by an ordinary pH meter having a glass electrode. The results are shown in Table 5.

A control run was conducted in the same way as above except that potassium chlorite and sodium propionate were not added.

The degree of growth of the mold, the specific activity of amylase and the number of living bacterial cells at different times were measured on the resulting cultivated products in the same way as in Example 1. The specific pectinase activity of the product of the invention is the value relative to that of the product of the control which is taken as 1. The measurement of the activity was performed as follows:

Ten grams of the cultivated product was added to 100 ml of distilled water, and the mixture was allowed to stand at 5° C. for 24 hours. The mixture was then filtered, and the filtrate was used as an enzyme solution. The pectinase activity of the enzyme solution was determined substantially in accordance with the method described in Journal of the Japanese Society of Agricul-

TABLE 5

| Items of measurement Sample | Degree of growth of mold | Enzyle activities of the fermented product | | Number of living bacterial cells per ml of the fermented product | | | pH |
|---|---|---|---|---|---|---|---|
| | | Specific protease activity | Specific amylase activity | At the start of cultivation | 18 hours after the start | At the end of the cultivation (42 hours from the start) | |
| Invention | ++ | 1.6 | 1.2 | $1.1 \times 10^1$ | $5.5 \times 10^0$ | $3.1 \times 10^0$ | 5.90 |
| Control | × | 1.0 | 1.0 | $1.0 \times 10^1$ | $8.8 \times 10^6$ | $3.7 \times 10^7$ | 4.40 |

It is seen from Table 5 that the present invention is much better than the control in regard to the degree of growth of the mold, the enzyme activities of the cultivated product and the number of living bacterial cells in the cultivated product.

EXAMPLE 4

A 1500-liter fermentation tank (for cultivation with aeration and agitation) was charged with 20 kg of wheat husk, 5 kg of defatted soybeans, 25 kg of potassium chlorite, 100 g of sodium propionate and 1000 liters of water, and saturated steam at 120° C. and 1 kg/cm² (gauge) was introduced into the tank to steam the materials, followed by allowing them to cool to room temperature.

Two kilograms of a seed mold (the number of available spores: $5 \times 10^8$/g; the number of contaminating bacteria: $2.8 \times 10^6$/g) of *Mucor javanicus* (IAM 6108) was inoculated in the resulting cultivation substrate, and cultivated for 60 hours at 35° C. at an air flow rate of 400 liters/min. with stirring at 200 rpm.

tural Chemistry, Vol. 43, No. 8, page 545 (1969).

The pH was measured in accordance with the method described in Example 3.

The results are shown in Table 6.

TABLE 6

| Items of measurement Sample | Degree of growth of mold | Enzyme activities of the cultivated product | | Number of living bacterial cells per ml of the cultivated product | | | pH |
|---|---|---|---|---|---|---|---|
| | | Specific amylase activity | Specific pectinase activity | At the start of cultivation | 18 hours after the start | At the end of the cultivation (42 hours from the start) | |
| Invention | ++ | 1.5 | 3.65 | $1.3 \times 10^0$ | $3.8 \times 10^1$ | $5.0 \times 10^1$ | 5.65 |
| Control | × | 1.0 | 1.00 | $1.2 \times 10^0$ | $1.1 \times 10^0$ | $1.7 \times 10^8$ | 4.25 |

It is seen from Table 6 that the present invention is much better than the control in regard to the degree of growth of the mold, the enzyme activities of the cultivated product, and the number of living bacterial cells in the cultivated product.

EXAMPLE 5

Water (560 liters) containing 2.4 kg of potassium acetate and 1.6 kg of chloramine-T was uniformly sprayed onto 800 kg of wheat husk.

The wheat husk was then steamed with saturated steam at 120° C. and 1 kg/cm² (gauge) for 45 minutes, and 2 kg of a seed mold (the number of available spores; $13 \times 10^8$/g) of *Penicillium glaucum* (AHU 8026) was inoculated in the treated wheat husk, and it was subjected to a usual control of koji making in an incubator at 30° C. for 70 hours to form a cultivated product.

A control run was conducted in the same way as above except that potassium acetate and chloramine-T were not added.

The degree of growth of the mold in the cultivated product, the specific activity of amylase and the number of living bacterial cells at different times were measured by the same methods as in Example 1. The pectinase activity was measured in accordance with the method shown in Example 4.

The results are shown in Table 7.

TABLE 7

| Items of measurement Sample | Degree of growth of mold | Enzyme activities of the cultivated product | | Number of living bacterial cells per g of the cultivated product | | |
|---|---|---|---|---|---|---|
| | | Specific amylase activity | Specific pectinase activity | At the start of cultivation | 18 hours after the start | At the end of cultivation (70 hours from the start) |
| Invention | ++ | 1.8 | 2.8 | $2.2 \times 10^0$ | $8.5 \times 10^1$ | $3.3 \times 10^2$ |
| Control | × | 1.0 | 1.0 | $2.3 \times 10^0$ | $3.3 \times 10^8$ | $7.5 \times 10^8$ |

It is seen from Table 7 that the present invention is much better than the control in the degree of growth of the mold, the enzyme activities of the cultivated product and the number of living bacterial cells in the cultivated product.

What we claimed is:

1. In a method for producing a fermentation koji product which comprises inoculating a koji mold in a substrate and cultivating it, the improvement which comprises adding (A) at least one compound selected from the group consisting of alkali metal salts of an acid selected from the group consisting of acetic acid and propionic acid, and (B) at least one compound selected from the group consisting of hypochlorous acid, alkali metal salts of hyposulfurous acid, alkli metal hydrogen sulfite, alkali metal pyrosulfite and hydrogen peroxide, at any time ranging from a step of preparing the substrate to the step of cultivation, the total amount of said compounds (A) and (B) being about 0.01 to about 2% by weight based on the weight of the substrate, and the weight ratio of compound (A) to compound (B) being from 1:4 to 4:1.

2. The method of claim 1 wherein said compounds (A) and (B) are added at any time ranging from the step of preparing the substrate to a time before the step of inoculating the mold.

3. The method of claim 1 wherein said substrate contains a denaturation product or an alpha-form of at least one member selected from the group consisting of soybean, defatted soybean, gluten, rice, wheat, corn, soy sauce lees, mirin lees, sake lees, wheat husk, rice bran and fishmeal.

* * * * *